Nov. 3, 1931. S. J. ELSBY, JR 1,830,429
AIRCRAFT CONTROL SYSTEM
Filed Jan. 10, 1931 2 Sheets-Sheet 1
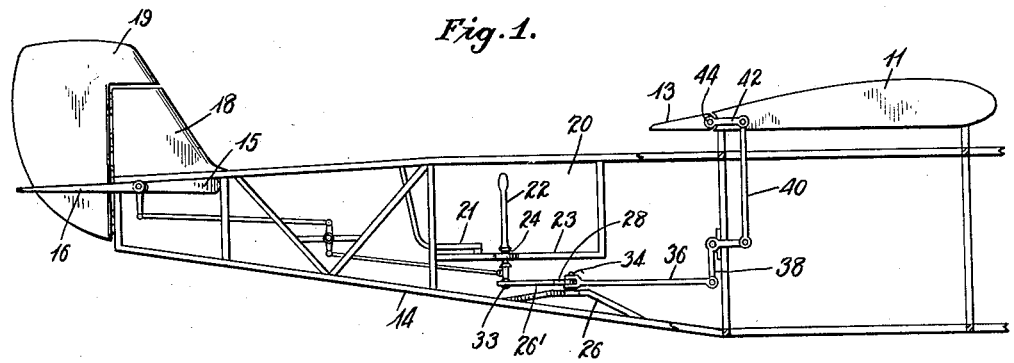
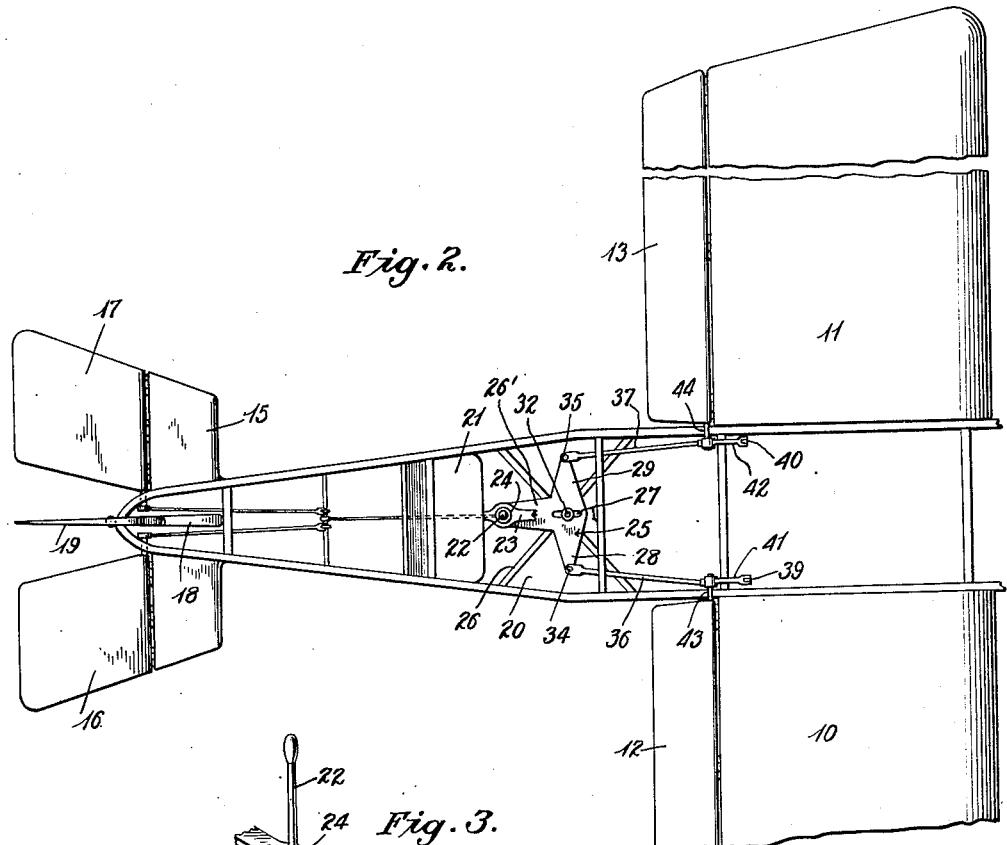
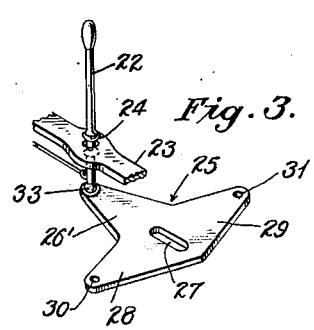
Inventor
S. J. Elsby, Jr.

Nov. 3, 1931.  S. J. ELSBY, JR  1,830,429
AIRCRAFT CONTROL SYSTEM
Filed Jan. 10, 1931   2 Sheets-Sheet 2
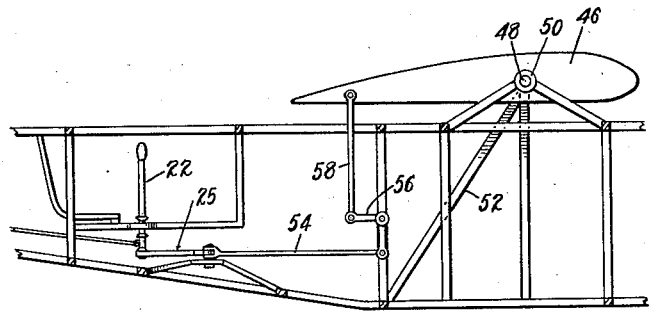
Fig. 4.
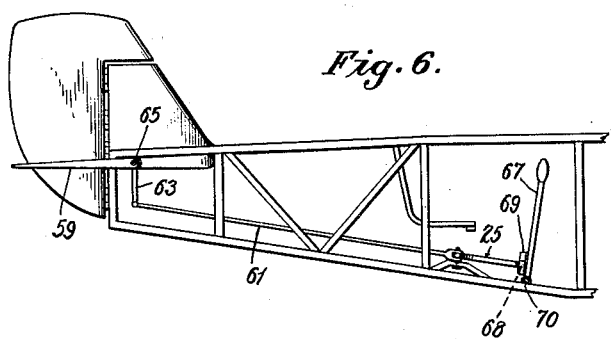
Fig. 6.
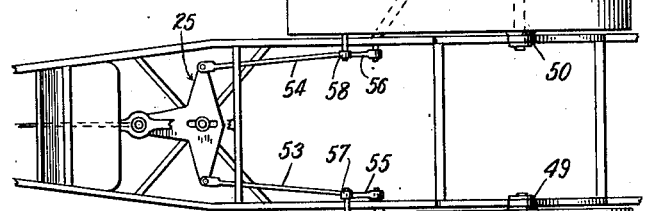
Fig. 5.
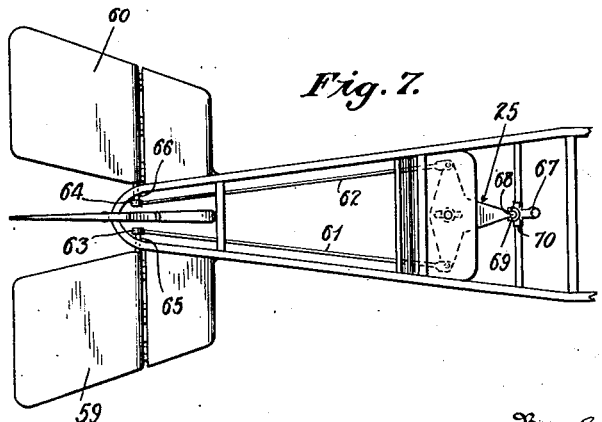
Fig. 7.
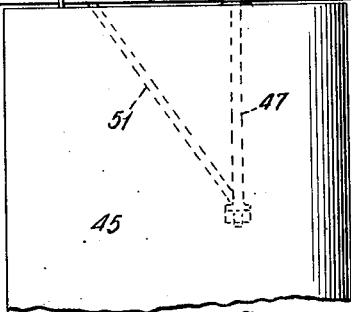
Inventor
S. J. Elsby, Jr.
Attorneys Patented Nov. 3, 1931

1,830,429

UNITED STATES PATENT OFFICE

SAMUEL J. ELSBY, JR., OF NEW ALBANY, INDIANA

AIR CRAFT CONTROL SYSTEM

Application filed January 10, 1931. Serial No. 507,979.

The present invention relates to means for facilitating the control of aircraft of all types and while particularly applicable to aeroplanes, may also be applied to wingless flying machines and lighter-than-air craft.

According to the invention, means are provided whereby a plurality of horizontal surfaces pivoted on axes transverse to the longitudinal axis of the aircraft may be swung either in unison, that is in the same direction, or in opposite directions through a single control member. The horizontal surfaces may be constituted by the usual ailerons, by wings which form a main lifting surface, or by elevators mounted for independent or concerted operation. An essential feature of the invention is a transmission member of novel form whereby movements of the control member, preferably a stick, are imparted to the horizontal surfaces to operate them in unison or in opposite directions.

In the accompanying drawings, which illustrate three possible embodiments of the invention, Figure 1 is a side elevation of an aeroplane having the fuselage covering removed, the forward portion of the fuselage being shown in vertical section, and the main plane center section being removed;

Figure 2 is a plan view of the machine of Figure 1;

Figure 3 is a perspective view of the transmission element above referred to and showing the manner of connecting a control stick thereto;

Figure 4 is a view generally similar to that of Figure 1, but illustrating another embodiment of the invention;

Figure 5 is a plan view of the machine of Figure 4;

Figure 6 is a side elevation of the rear portion of a fuselage and illustrates a further embodiment of the invention; and Figure 7 is a plan view of the structure shown in Figure 6.

Referring first to Figures 1, 2, and 3, reference numerals 10 and 11 designate respectively the right and left wings of a main plane, ailerons 12 and 13 being pivoted to the trailing portions of the wings in the usual manner. Reference numeral 14 designates a fuselage which at its rear end carries the usual horizontal stabilizer 15, elevators 16 and 17, vertical stabilizer or fin 18, and rudder 19.

In the cock pit 20, in the usual position in front of the pilot's seat 21, is mounted a control stick 22 in a supporting frame member 23 which extends longitudinally of the fuselage. A universal mounting 24 is provided in frame member 23, the stick being slidable therein.

A substantially T-shaped transmission member 25 is mounted beneath member 23 on a frame 26. Member 25 has a main or body portion 26' extending longitudinally of the machine and provided with a longitudinally extending elongated slot 27. At its forward end, member 25 has two oppositely extending arms 28 and 29 provided at their extremities with apertures 30 and 31. A vertically extending bolt or pin 32 mounted on frame 26 projects upwardly through slot 27. Member 25 is displaceable relative to pin 32 in the longitudinal direction of the machine throughout the extent of slot 27 and the member is also pivotal about the pin. The lower end of stick 22 has a universal connection as at 33 with the rear end of member 25 and it will be evident that fore and aft movements of the stick will slidably reciprocate member 25, whereas lateral movements of the stick will impart pivotal movements to member 25 about pin 32.

Pins 34 and 35 passed through apertures 30 and 31 engage the ends of forwardly extending rigid links 36 and 37, whose other ends are connected to bell crank levers of which one is shown at 38, Figure 1, the levers being pivoted in coaxial relation on an axis extending transversely of the fuselage. The other ends of the bell crank levers are connected through rigid links 39 and 40 with arms 41 and 42 rigidly fixed on the pivot rods 43 and 44 of ailerons 12 and 13 respectively.

The stick 22 is connected through any convenient transmission means with elevators 16 and 17. In Figures 1 and 2 I have illustrated a transmission system comprising levers and rigid links and whose operation will be readily understood without particular description thereof.

It will be evident that upon fore and aft movement of control stick 22 to effect adjustment of the elevators, ailerons 12 and 13 will be moved in unison, that is in the same direction, on pivot rods 43 and 44. Thus, if stick 22 is pushed forward to depress the elevators and nose the machine downward, the ailerons will be swung upwardly to decrease the lift of the main plane, thus supplementing the action of the elevators.

Lateral swinging of the control stick causes movement of the ailerons in opposite directions in the usual manner for banking the machine. For example, if the stick is swung to the left, the rear end of transmission member 25 will be moved to the right, compressing link 36 and tensioning link 37 so that aileron 12 will be swung downwardly and aileron 13 upwardly to throw the machine into a left hand bank. Proper banking action can be secured regardless of the position of the ailerons as determined by the longitudinal relation of member 25 to pin 32.

In the embodiment of the invention just described, the ailerons are adjustable to vary the wing camber and consequently its lift. According to the embodiment of the invention illustrated in Figures 4 and 5 the wings themselves are adjustable relative to the fuselage to vary their angle of incidence and they are also adjustable to bank the machine.

According to Figures 4 and 5, wings 45 and 46 are fixed on rods 47 and 48 which may be conveniently attached to the front wing spars or may form a part of such spars. The inner ends of rods 47 and 48 are journaled in bearings 49 and 50, while the outer ends of the rods are journaled in the ends of struts 51 and 52. Member 25 is connected through rigid links 53 and 54, bell crank levers 55 and 56, and rigid links 57 and 58 with wings 45 and 46 at points rearwardly spaced from rods 48. Fore and aft movements of control stick 22 rock wings 45 and 46 in unison about the axes of rods 47 and 48 to vary the angle of incidence of the wings in conjunction with the operation of the elevators. Lateral movements of the stick cause the wings to swing in opposite directions for banking the machine.

The fuselage portion shown in Figures 6 and 7 is assumed to be associated with a lighter-than-air craft, a wingless flying machine such as a helicopter, autogiro, or the like, banking effect being here effected through opposite swinging movements of the elevators 59 and 60. It will be noted that the position of member 25 is reversed as compared to its position in the embodiments hereinbefore described, the laterally extending arms being connected with the elevators through rigid links 61 and 62 and downwardly projecting arms 63 and 64 rigidly secured to the pivot rods 65 and 66 of the elevators. Purely fore and aft movements of the control stick 67 cause the operation of the elevators in unison in the usual manner, while lateral movements of the stick cause opposite swinging movements of the elevators to bank the machine. The connection between member 25 and stick 67 is secured by means of a ball 68 rigidly fixed at the forward end of member 25 and slidably engaged in a cleat 69 mounted on the stick and extending in the longitudinal direction thereof. The cleat grips the ball for swinging member 25 and permits the ball to slide up and down therein so as to obviate any distortive effects on member 25 through change of the angular position of the stick relative thereof. The stick is provided at its lower end with a universal mounting 70.

While I have described a number of practical embodiments of the invention, it will be understood that I do not limit myself to the exact structure disclosed. Various changes may be made without departure from the invention as defined in the following claims.

I claim:

1. In an aircraft, a plurality of horizontal surfaces pivoted on axes transverse to the longitudinal axis of the aircraft, a transmission member comprising a body portion and arms projecting from opposite sides of said body portion adjacent an end thereof, said body portion having a longitudinally extending slot therein, a pivot pin engaged in said slot, a control member operable to slide said transmission member relative to the pin and to swing it about the pin, and connections between said arms and control surfaces whereby sliding movements of the transmission member cause swinging of the surfaces in unison and pivotal movements of the transmission member cause swinging of the surfaces in opposite directions.

2. In an aircraft, a plurality of horizontal surfaces pivoted on axes transverse to the longitudinal axis of the aircraft, a transmission member slidable in the longitudinal direction of the aircraft and pivotal about a vertical axis, a control stick in connection with one end of said transmission member, and means connecting the surfaces with the other end of said transmission member at transversely spaced points on the latter whereby sliding movements of said member cause swinging of the surfaces in unison and pivotal movements of said member cause swinging of the surfaces in opposite directions.

In testimony whereof I have hereunto set my hand.

SAMUEL J. ELSBY, Jr.